US012745328B2

(12) United States Patent
Andre

(10) Patent No.: US 12,745,328 B2
(45) Date of Patent: Sep. 22, 2026

(54) DRIVING GROUPS OF PIXELS OF A LIGHT SOURCE SO AS TO PRODUCE A LIGHT TRANSITION

(71) Applicant: VALEO VISION, Bobigny Cedex (FR)

(72) Inventor: Stephane Andre, Bobigny Cedex (FR)

(73) Assignee: VALEO VISION, Bobigny Cedex (FR)

( * ) Notice: Subject to any disclaimer, the term of this patent is extended or adjusted under 35 U.S.C. 154(b) by 105 days.

(21) Appl. No.: 18/717,312

(22) PCT Filed: Dec. 12, 2022

(86) PCT No.: PCT/EP2022/085334
§ 371 (c)(1),
(2) Date: Jun. 6, 2024

(87) PCT Pub. No.: WO2023/105082
PCT Pub. Date: Jun. 15, 2023

(65) Prior Publication Data

US 2025/0040005 A1 Jan. 30, 2025

(30) Foreign Application Priority Data

Dec. 10, 2021 (FR) ....................................... 2113334

(51) Int. Cl.
*H05B 45/10* (2020.01)
*H05B 47/18* (2020.01)

(52) U.S. Cl.
CPC ............. *H05B 45/10* (2020.01); *H05B 47/18* (2020.01)

(58) Field of Classification Search
None
See application file for complete search history.

(56) References Cited

U.S. PATENT DOCUMENTS

| | | | | |
|---|---|---|---|---|
| 2015/0195874 | A1* | 7/2015 | Kang | H05B 45/48 315/192 |
| 2016/0309552 | A1 | 10/2016 | Kuerschner et al. | |
| 2017/0057402 | A1 | 3/2017 | Uesugi et al. | |
| 2017/0367159 | A1 | 12/2017 | Welten | |
| 2020/0275542 | A1 | 8/2020 | Ichikawa et al. | |
| 2020/0314984 | A1 | 10/2020 | Fukatsu et al. | |
| 2021/0358997 | A1* | 11/2021 | Lopez | H10H 20/8312 |

FOREIGN PATENT DOCUMENTS

WO WO 2021/232017 A1 11/2021

OTHER PUBLICATIONS

International Search Report & Written Opinion mailed on Mar. 13, 2023 in PCT/EP2022/085334 filed on Dec. 12, 2022, 15 pages.

* cited by examiner

*Primary Examiner* — Kenneth B Wells
(74) *Attorney, Agent, or Firm* — Oblon, McClelland, Maier & Neustadt, L.L.P.

(57) ABSTRACT

A method for controlling a pixelated light source which includes a plurality of pixels. Following the receipt of a command to transition from an initial beam to a target beam, a target luminosity based on the target beam is defined for each pixel of the pixelated light source. The pixels of the light source are then grouped into at least two groups of pixels and the method includes successively driving the groups of pixels. Driving a group of pixels includes modifying the luminosity of each pixel of the group, from an initial luminosity to the target luminosity of the pixel.

16 Claims, 10 Drawing Sheets

DRIVING GROUPS OF PIXELS OF A LIGHT SOURCE SO AS TO PRODUCE A LIGHT TRANSITION

The present invention relates to the field of controlling a pixelated source of a signaling or lighting system, notably for an automotive vehicle. More specifically, the invention relates to producing a light transition from an initial beam to a target beam.

It is becoming increasingly common to use semiconductor-element light sources, such as light-emitting diodes (LEDs), to perform various light functions of a vehicle. These functions may, for example, include the daytime running lights, the position lights, the turn indicators or the low beams. Using these small, high-luminosity and low-power light sources also makes it possible to produce original luminous shapes in a compact and low-power system. A pixelated light source, typically proposed in the form of an array comprising a large number of individually driven light-emitting diodes, further makes it possible to create very varied beams: according to the chosen drive mode, an array source may, by way of example, project a shape or a graphic onto the road, generate a combination of high beams (HBs) and low beams (LBs), or provide dynamic and directional lights.

Other pixelated sources may be based on technologies other than LEDs. Notably, monolithic or digital micromirror device (DMD) pixelated sources are known.

In accordance with the context in which the vehicle is driven, it may be necessary to change the light beam produced by the signaling or lighting system. For example, such a transition may consist in moving from a high beam (HB) to a low beam (LB), notably when the vehicle passes another vehicle. Another transition may correspond to adapting the high beam (HB) or low beam (LB) from a straight beam to a bending beam. Other transitions may be caused by a change in the surroundings of the vehicle, such as a change in natural luminosity surrounding the vehicle.

It is desirable for the light transition not to occur suddenly, for esthetic reasons, but also, and above all, for safety reasons in order not to surprise the other road users as well as the driver of the vehicle.

The patent application publication US2017057402A1 proposes, to this end, to define a set of beams which are intermediate between the initial beam and the target beam. To this end, the luminosity of each of the pixels of the light source varies from an initial value to a target value, moving through intermediate values for each intermediate beam.

In particular, FIGS. 3A to 3H illustrate the luminosity values for the initial beam, the six intermediate beams and the target beam, for a source comprising eight regions labeled PHa to PHh, corresponding respectively to the eight pixels of the light source.

However, such a solution is not adapted to a pixelated light source comprising a large number of pixels, for example several hundred or even several thousand pixels, which lighting/signaling systems now make possible.

Indeed, applying the solution of the patent application above would lead to very significant computational costs for determining the intermediate values of hundreds or even thousands of pixels. Such computational costs would cause a drastic increase in the cost of the lighting or signaling system.

The present invention improves the situation.

To this end, a first aspect of the invention relates to a method for controlling a pixelated light source of a lighting or signaling system for a light transition from an initial beam to a target beam, the pixelated light source comprising a plurality of pixels, the method comprising the following steps:

- receiving a command to transition from an initial beam to a target beam;
- for each pixel of the pixelated light source, defining a target luminosity based on the target beam;
- grouping the pixels of the light source into at least two groups of pixels, each group of pixels comprising at least one pixel;
- successively driving the groups of pixels, driving a group of pixels comprising modifying the luminosity of each pixel of the group, from an initial luminosity to the target luminosity of the pixel.

In the vocabulary of a person skilled in the art, a "pixel" is also called an "elementary light source". Thus, a pixelated light source comprises a plurality of elementary light sources.

A group of pixels may comprise at least one pixel of the pixelated light source.

In the present document, luminosity is understood as the luminous power of the lighting pixel. The pixel may have a low, medium or high luminosity. Luminosity may be represented by luminous flux, the unit of measurement of which is the lumen (symbol: lm—SI units).

According to one embodiment, the step of defining a target luminosity for each pixel of the pixelated light source based on the target beam may comprise a substep for converting the target luminosity into target electrical parameters to be applied to the pixel under consideration so as to reach this target luminosity. The electrical parameters may be a duty cycle of the pulse-width modulation (commonly abbreviated PWM) signal and/or an electric current. Thus, in accordance with the target beam, the electrical parameters may be different from one pixel to another.

In this embodiment, the step for successively driving the groups of pixels from an initial luminosity to the target luminosity of the pixel in these groups consists of applying the target electrical parameters defined in the preceding step to each pixel. For example, driving consists in a pulse-width modulation command, applying the target duty cycle to each pixel. In other words, for each of the pixels of the pixelated light source, at an equal electric current, the duty cycle which is associated with it in the initial beam may be different from the duty cycle which is associated with it in the target beam.

In addition, in the proposed method, the groups of pixels for which the luminosity has been modified from the initial luminosity to the target luminosity remain in this last state until the end of the transition from the initial beam to the target beam.

According to one embodiment, the groups of pixels may be driven successively in a random order.

Such an embodiment makes it possible to improve the reactivity of the method and to reduce the computational costs associated with the transition from the initial beam to the target beam. Alternatively, the method may further comprise defining a sequence of groups, and the groups of pixels may be driven successively in the defined sequence.

Such an embodiment makes it possible to improve the visual performance associated with the transition from the initial beam to the target beam.

According to one embodiment, the pixels of a group of pixels may be adjacent.

Thus, the grouping of pixels is based on spatial criteria, which improves the continuous nature of the transition and makes driving the groups of pixels easier.

According to one embodiment, the groups of pixels may be predefined.

Thus, the reactivity associated with the method is improved and the computational costs are reduced.

Alternatively, the groups of pixels may be defined based on the target luminosities of the pixels of the light source.

The luminous performance associated with the continuous nature of the transition between the initial beam and the target beam is thus improved, and driving the groups is simplified. In the embodiment in which driving from the initial beam to the target beam consists of applying a duty cycle to the pixels, the grouping by target luminosities may be a grouping of the pixels for which the target duty cycles are relatively close (with a difference of +/−5% to 10%, for example) or identical. In this case, driving occurs in the successive order of the groups, each of these groups comprising the pixels with the similar or identical target duty cycles. In this way, in one example of an embodiment, the group of pixels for which the target duty cycle of each of the pixels of this group is lower than that of the pixels of the other groups may be driven first. Conversely, the group of pixels for which the target duty cycle of each of the pixels is higher than that of the pixels of the other groups may be driven first.

According to one embodiment, the grouping of the pixels may be determined in accordance with the initial and target luminosities of the pixels of the groups.

According to one embodiment, the pixels of the light source may be grouped into N groups, N being greater than 1, and N depending on a duration of the transition between the initial beam and the target beam.

Thus, the transition may be limited to a given duration, in order not to delay producing the target beam which may notably fulfill lighting functions and improve the safety with which the vehicle is driven.

In addition, N may further depend on a visual resolution frequency.

Thus, this embodiment makes it possible to ensure that the continuous transition between the beams is actually perceived by the human eye, and that the transition is not produced too quickly at the risk of appearing sudden.

A second aspect of the invention relates to a computer program comprising instructions for implementing the method according to the first aspect of the invention, when these instructions are executed by a processor.

A third aspect of the invention relates to a lighting or signaling system of an automotive vehicle, comprising a pixelated light source and a control module for the pixelated light source, wherein the pixelated light source comprises a plurality of pixels and the control module comprises:

- a first interface configured to receive a command to transition from an initial beam to a target beam;
- a processor configured to define, for each pixel of the pixelated light source, a target luminosity based on the target beam and to group the pixels of the light source into at least two groups of pixels, each group of pixels comprising at least one pixel;
- a second interface configured to successively drive the groups of pixels, driving a group of pixels comprising modifying the luminosity of each pixel of the group, from an initial luminosity to the target luminosity of the pixel.

In one embodiment, the processor is configured to translate the target luminosity into a target electrical parameter. The second interface is configured to apply the target electrical parameter to each pixel while the groups of pixels are successively driven from the initial luminosity to the target luminosity of the pixel.

Another subject of the invention relates to an automotive vehicle comprising the lighting and signaling system according to the invention.

Other features and advantages of the invention will become apparent upon examining the following detailed description and the appended drawings, in which.

Figure 3A:
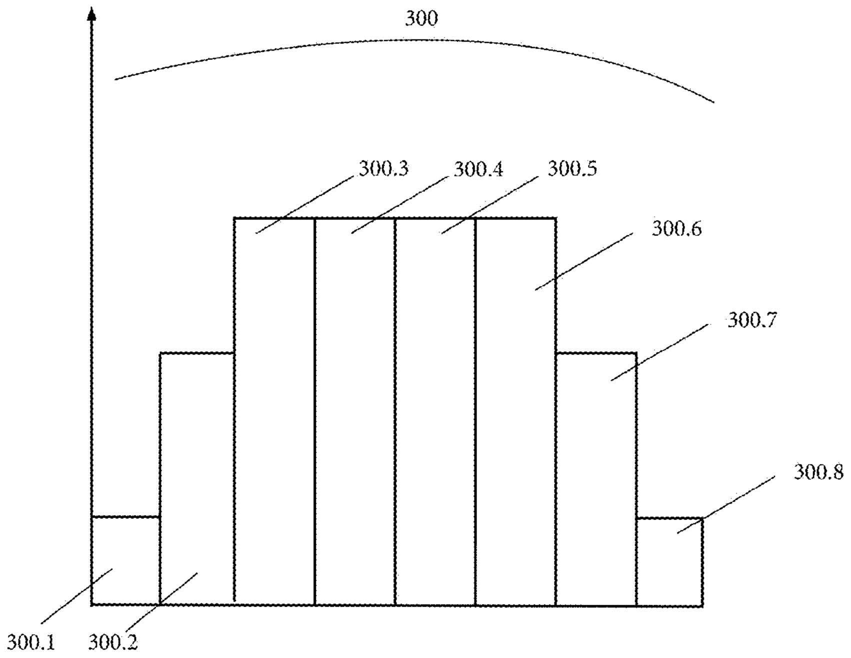
Figure 3B:
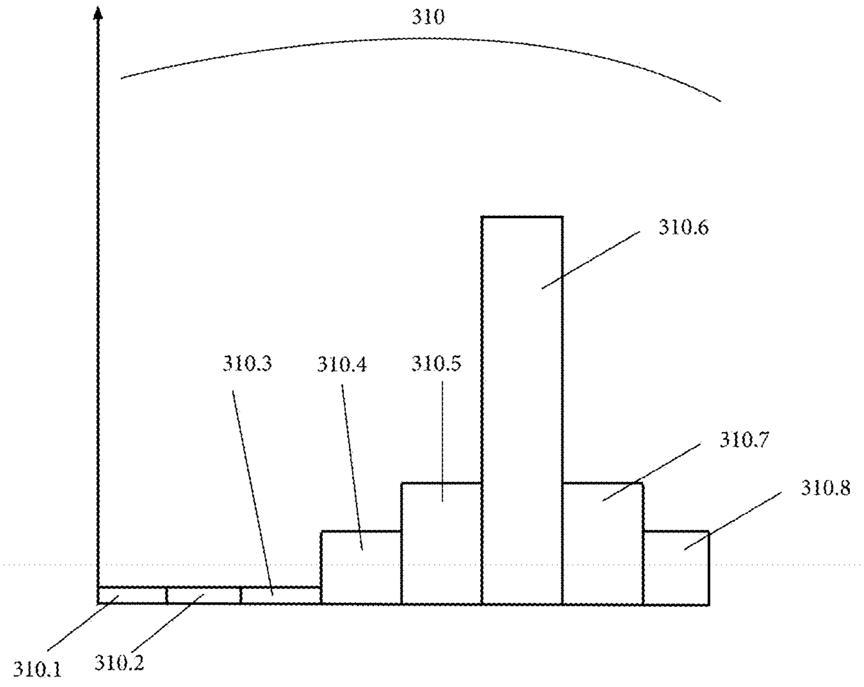
Figure 4:
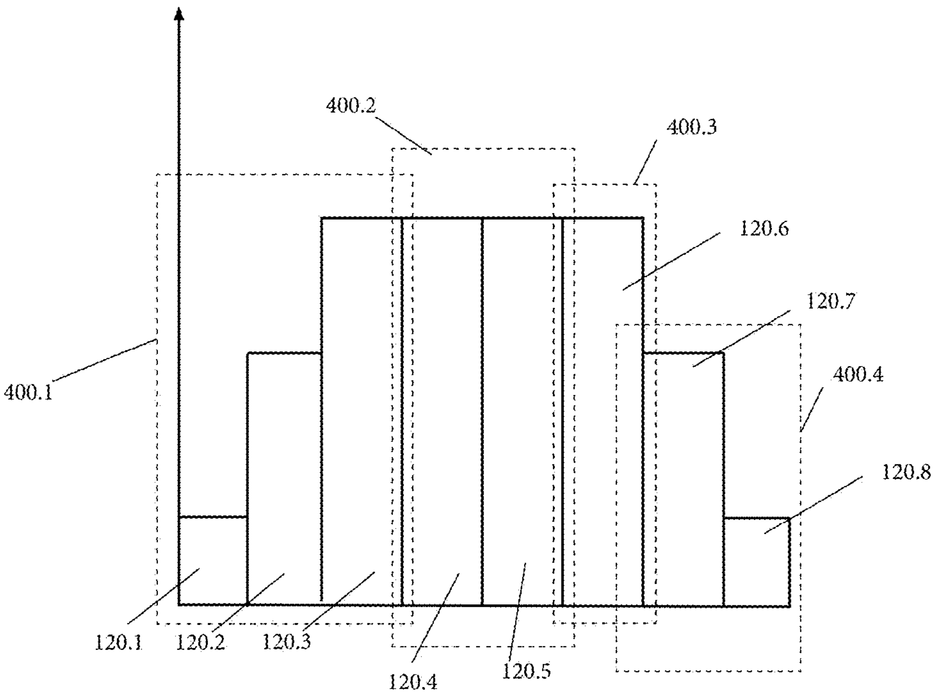
Figure 5A:
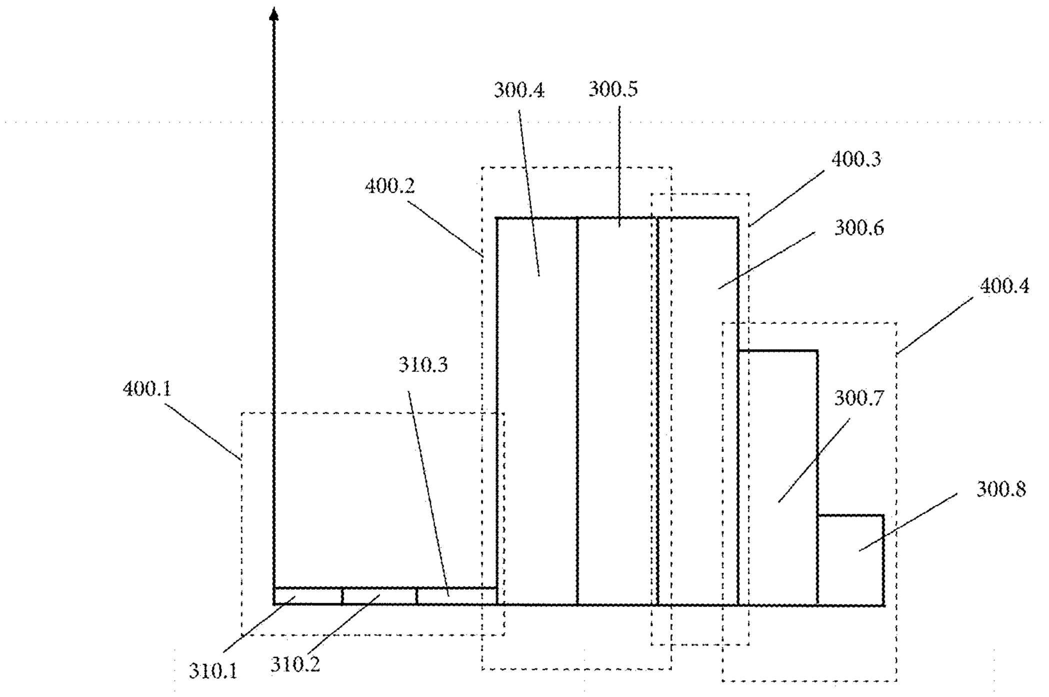
Figure 5B:
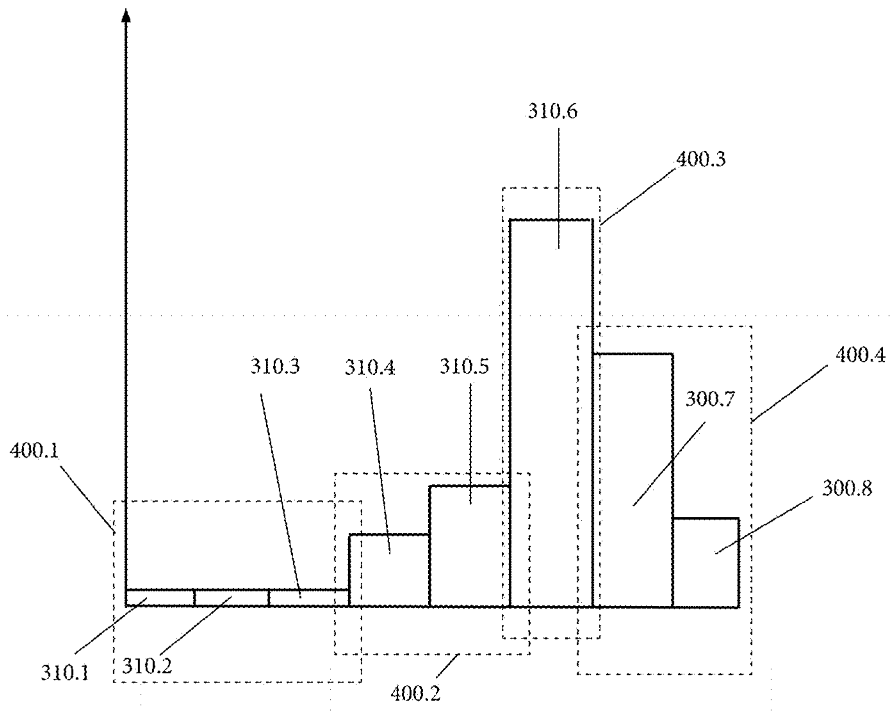
Figure 5C:
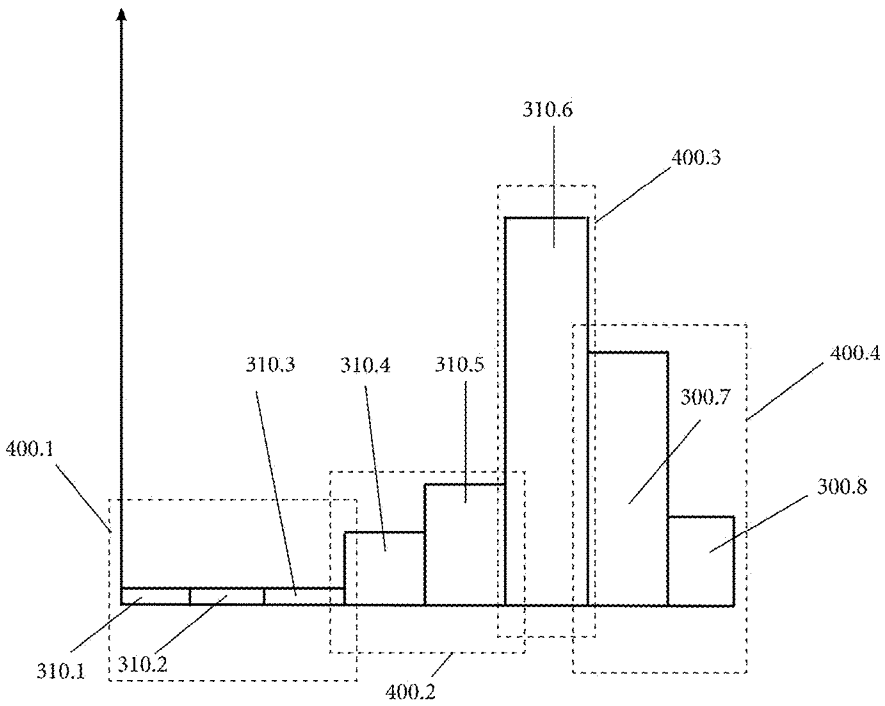
Figure 5D:
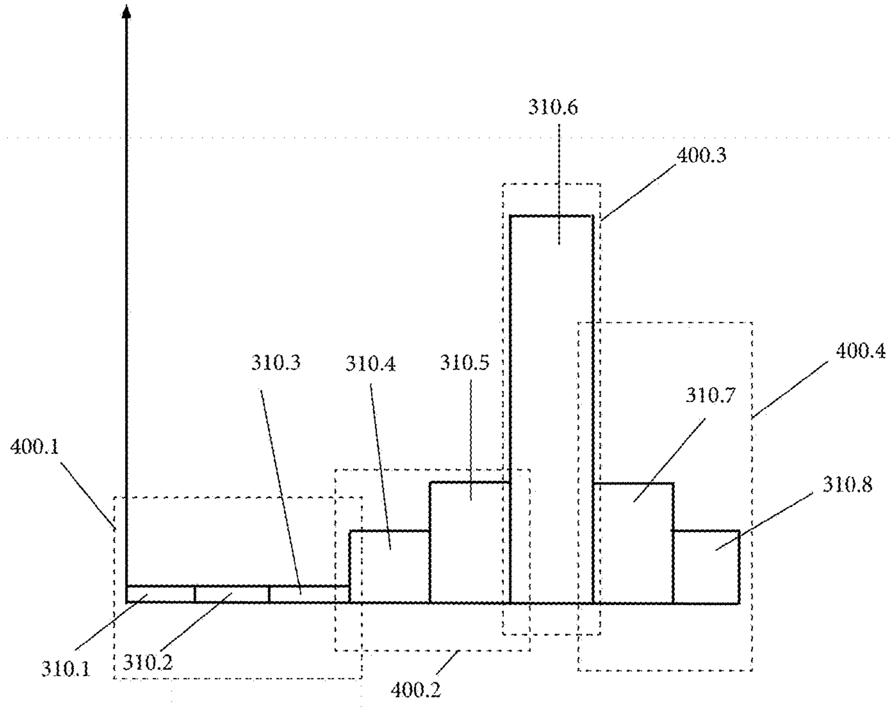
Figure 6:
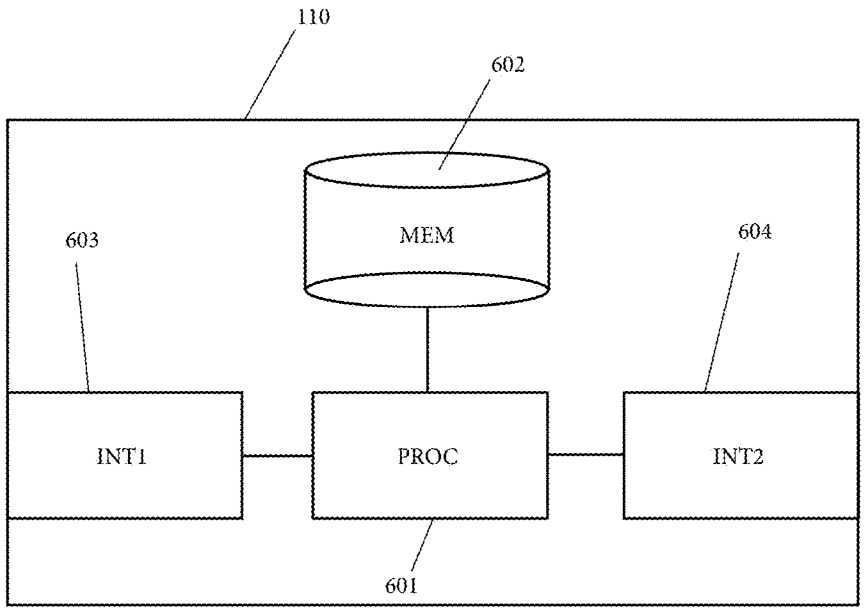

FIG. 3*a* illustrates an initial beam defining initial intensities of pixels of the light source according to one embodiment of the invention;

FIG. 3*b* illustrates a target beam defining target intensities of pixels of the light source according to one embodiment of the invention;

FIG. 4 illustrates the result of defining groups of pixels for driving them successively, according to one embodiment of the invention;

FIG. 5*a* illustrates driving a first group of pixels, according to one embodiment of the invention;

FIG. 5*b* illustrates driving a second group of pixels, according to one embodiment of the invention;

FIG. 5*c* illustrates driving a third group of a single pixel, according to one embodiment of the invention;

FIG. 5*d* illustrates driving a fourth group of pixels, according to one embodiment of the invention;

FIG. 6 illustrates a structure of a control module for a lighting or signaling system according to one embodiment of the invention.

The description concentrates on the features which differentiate the method or the system from those known in the prior art. The operation and the manufacture of the pixelated or array light sources, or light-emitting diodes, will not be described in detail since it is known in itself from the prior art. For example, it is known practice to propose arrays comprising hundreds or thousands of semiconductor components of micro-LED type, or indeed to manufacture a monolithic pixelated source, by forming the light-emitting semiconductor elements during a common layer-deposition method.

Although the electrical features of the light-emitting diodes which compose such an array may vary, it is reasonable to suppose that a prior calibration (e.g. a command calibrated so as to take load current variations into account) is carried out at the moment when the pixelated source is manufactured, or when it is mounted when the light module is assembled.

Figure 1:
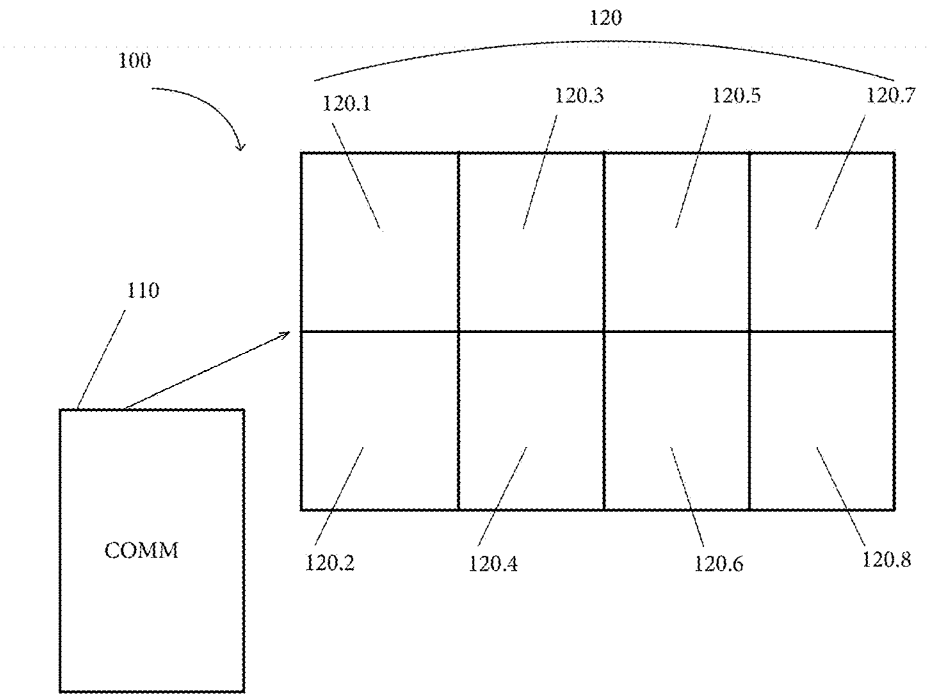
FIG. 1 illustrates a lighting or signaling system according to one embodiment of the invention.

FIG. 1 depicts a lighting system 100 according to one embodiment of the invention.

The lighting system may comprise a pixelated light source 120. The pixelated light source 120 may, for example, be an array of pixels. In FIG. 1, the array 120 comprises two rows of four pixels 120.1 to 120.8, or eight pixels in all. However, no restriction is attached to the number of pixels or to their arrangement in the light source 120. In particular, the invention is advantageously applicable to light sources comprising a large number of pixels, for example several hundred or even several thousand pixels.

The light source 120 may notably comprise any number of rows and any number of columns. In addition, no restriction is attached to the shape of the light source 120, which is not necessarily rectangular. For example, some columns, or rows, may comprise more pixels than other columns, or rows.

Preferably, the pixels may be semiconductor elements, such as light-emitting diodes (LEDs). Other pixelated sources may be based on technologies other than LEDs. Notably, monolithic or digital micromirror device (DMD) pixelated sources are known.

The lighting system 100 further comprises a control module 110 which is able to drive the light source 120, notably to drive the luminosity of the pixels of the light source. Driving the respective luminosities of the pixels 120.1 to 120.8 makes it possible to produce varied light beams, which may notably correspond to varied light functions. The light functions may, for example, comprise the low beam (LB) function, the high beam (HB) function, dynamic (DBL) functions, notably on bends, or any other lighting or signaling light function.

Figure 2:
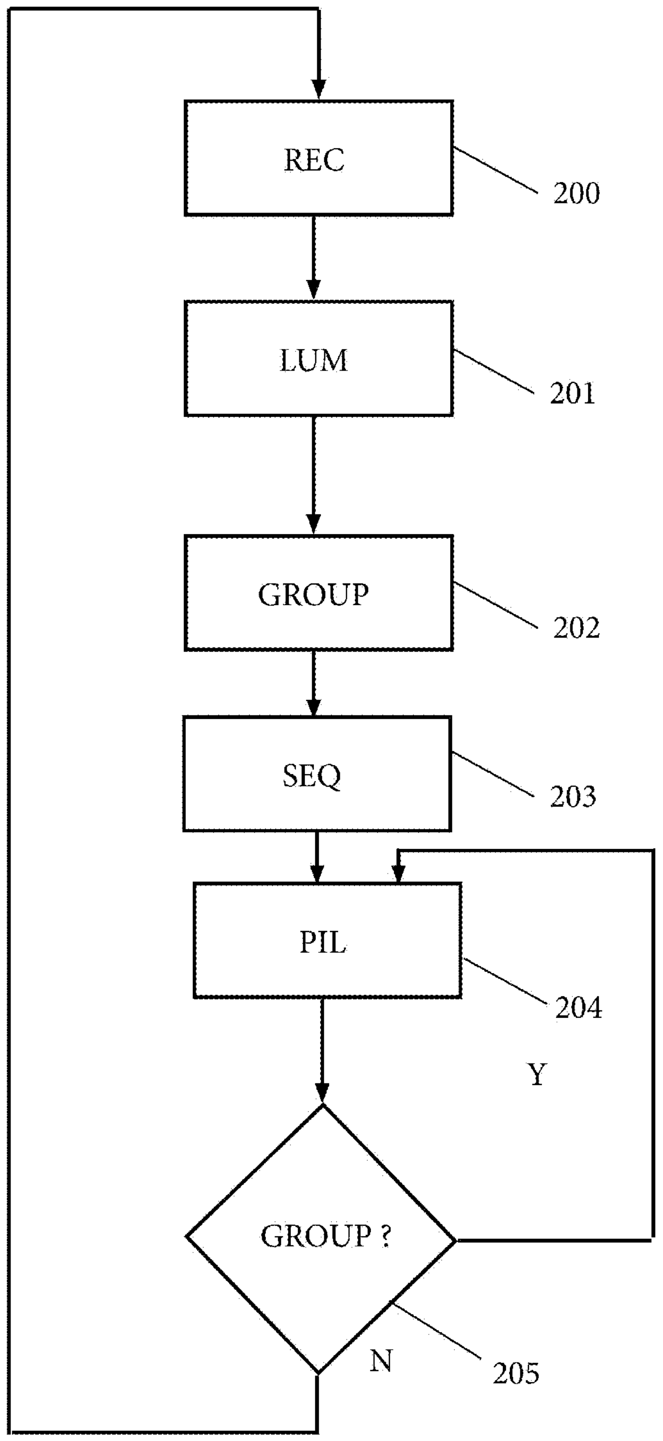
FIG. 2 is a diagram illustrating the steps of a method according to one embodiment of the invention.

FIG. 2 is a diagram illustrating the steps of a method according to one embodiment of the invention.

Initially, the lighting or control system 100 performs an initial function, corresponding to respective luminosity values for the pixels 120.1 to 120.8.

In a step 200, the control module 110 receives a command to transition from the initial beam to a target beam. For example, such a transition may consist of changing from a high beam (HB) to a low beam (LB), when the vehicle passes another vehicle. Another transition may correspond to adapting the high beam (HB) to a low beam (LB), from a straight beam to a bending beam. Other transitions may be caused by a change in the surroundings of the vehicle, such as a change in natural luminosity surrounding the vehicle. Thus, no restriction is attached to the initial beam and target beam.

The transition command may comprise an identifier of the target beam. No restriction is attached to such an identifier, which may be an identifier from a predetermined set of identifiers of light beams. Alternatively, the target beam may be identified by a set of parameters. For example, for a dynamic bending function, the parameter may be a rotation angle of the steering wheel.

In a step 201, the control module 110 determines, for each pixel of the pixelated light source, a target luminosity based on the target beam. Such a determination step is well known and is not detailed further. The target luminosity values may, for example, be stored in a memory of the control module 110 or may be determined dynamically based on the target beam.

In a step 202, the control module 110 groups the pixels 120.1 to 120.8 of the light source 120 into at least two groups of pixels. The groups of pixels may, for example, be predefined. For example, the pixels may be grouped by zones of the light source 120. In this case, the pixels of the same group are adjacent. Alternatively, the groups of pixels may be defined based on the respective luminosities of the pixels 120.1 to 120.8. For example, one group may comprise the pixels of lower luminosities and another group may comprise the pixels of higher luminosities. No restriction is attached to the criterion used to group the pixels into at least two groups.

In addition, no restriction is attached to the number N of groups, which is any integer N greater than or equal to 2. The number N may notably be determined based on a transition duration. The transition duration may be predetermined or may be indicated in the transition command received in the step 200. The transition duration may notably be of the order of a second, for example between one and three seconds. The number N may further be determined based on a visual resolution frequency. Indeed, in order to make a transition which is perceived as continuous possible, account should be taken of the resolution frequency of the human eye.

The step 203 is optional and will be described later.

In a step 204, the control module 110 drives a first group of pixels among the groups of pixels defined in the step 202, driving the first group of pixels comprising modifying the luminosity of each pixel of the group, from an initial luminosity to the target luminosity of the pixel. The initial luminosity is defined based on the initial beam.

In a step 205, the control module 110 verifies whether at least one group has not been driven according to the step 204. If there remains at least one group to be driven, the method returns to the step 205. Otherwise, all the groups of pixels have been driven successively, and the method returns to the step 200 until receipt of a new transition command. The target beam then becomes the initial beam of a following iteration of the method according to the invention.

Grouping the pixels and successively driving these groups by switching the luminosity of the pixels of a group directly from an initial luminosity to the target luminosity makes it possible to carry out a continuous transition, without the need to determine intermediate luminosities for all of the pixels as in the prior art. The continuous nature of the transition is made possible by driving the pixels "spatially", rather than by gradual variation of the intensities of all the pixels. The method according to the invention may thus be implemented in the case of a light source 120 with a large number of pixels, such as several hundred or even several thousand pixels.

In the aforementioned optional step 203, the control module 110 may define a sequence ordering the groups defined in the step 202. In this embodiment, the control module 110 thus drives the groups of pixels in the sequence defined in the step 203. No restriction is attached to the way in which the sequence is defined in the step 203. The sequence may, for example, be predefined. As a variant, it may be determined in accordance with the initial and target luminosities of the pixels of the groups. For example, the group of pixels for which the differences between the initial and target luminosities are greatest may be driven first, or alternatively last. As another variant, the sequence may be determined in accordance with the spatial distribution of the groups. The sequence is thus based on a spatial orientation of the groups. Defining a sequence makes it possible to improve the visual performance associated with the transition between the initial beam and the target beam.

Alternatively, the groups are driven in the steps 204 and 205 in a random order, that is to say without defining a sequence in the step 203. Such an embodiment makes it possible to improve the reactivity of the method and to reduce the computational costs.

FIG. 3*a* illustrates an initial light beam 300 defining initial luminous intensity levels for the pixels of the light source 120 according to one embodiment of the invention. The initial beam 300 is depicted in the context of the light source 120 with eight pixels 120.1 to 120.8. It may, however, be generalized to any pixelated light source, whatever the number of pixels and their respective arrangements.

Eight initial intensities 300.1 to 300.8 thus correspond to the pixels 120.1 to 120.8, respectively. No restriction is attached to the initial luminous intensities 300.1 to 300.8 defined by the initial beam 300.

FIG. 3*b* illustrates a target light beam 310 defining target luminous intensity levels for the pixels of the light source 120 according to one embodiment of the invention. The target beam 310 is depicted in the context of the light source 120 with eight pixels 120.1 to 120.8. It may, however, be generalized to any pixelated light source, whatever the number of pixels and their respective arrangements.

Eight target intensities 310.1 to 310.8 thus correspond to the pixels 120.1 to 120.8, respectively. No restriction is attached to the target luminous intensities 310.1 to 310.8 defined by the target beam 310.

In what follows, the method according to the invention described in FIG. 2 is applied to a transition between the initial beam 300 and the target beam 310, purely by way of illustration.

FIG. 4 presents the result of the step 202 of grouping the pixels 120.1 to 120.8 of the light source.

Although FIG. 4 illustrates the respective luminous intensities of the pixels for the initial beam 300 of FIG. 3*a*, it is understood that each luminous intensity represents the pixel with which it is associated. The reference signs 120.1 to 120.8 are thus placed by each of the columns representing the luminous intensities.

In this example, the pixels 120.1, 120.2 and 120.3 are grouped into a first group 400.1. The pixels 120.1 to 120.3 may notably be grouped together since their target luminosities 310.1 to 310.3 in FIG. 3*b* are close, and since the pixels 120.1 to 120.3 are adjacent. More generally, the criterion adopted in this example is to group the pixels which are close spatially in the light source 120 and the target intensities of which are close.

The pixels 120.4 and 120.5 are thus grouped into a second group 400.2. The pixel 120.6 alone constitutes the third group 400.3. The pixels 120.7 and 120.8 are grouped into the fourth group 400.4. FIG. 4 thus presents the result of the method at the end of the step 202.

In what follows, it is considered that a sequence was defined in the step 203, and that the groups 400.1 to 400.4 are driven successively in the following sequence: 400.1 then 400.2 then 400.3 then 400.4. Such a sequence is given purely by way of illustration: another sequence could have been defined, for example from 400.4 to 400.1, or a random order could have been used.

FIG. 5*a* illustrates the result of driving the first group 400.1, following a first iteration of the step 204, according to one embodiment of the invention.

During the first iteration of the step 204, the first group 400.1 is driven so as to modify the luminous intensities of the pixels 120.1, 120.2 and 120.3 from their initial intensities 300.1, 300.2 and 300.3 to their target intensities 310.1, 310.2 and 310.3, without moving through intermediate luminous intensities.

FIG. 5*b* illustrates the result of driving the second group 400.2, following a second iteration of the step 204, according to one embodiment of the invention.

During the second iteration of the step 204, the second group 400.2 is driven so as to modify the luminous intensities of the pixels 120.4 and 120.5 from their initial intensities 300.4 and 300.5 to their target intensities 310.4 and 310.5, without moving through intermediate luminous intensities.

FIG. 5*c* illustrates the result of driving the third group 400.3, following a third iteration of the step 204, according to one embodiment of the invention.

During the third iteration of the step 204, the third group 400.3 is driven so as to modify the luminous intensity of the pixel 120.6 from its initial intensity 300.6 to its target intensity 310.6, without moving through intermediate luminous intensities.

FIG. 5*d* illustrates the result of driving the fourth group 400.4, following a fourth and final iteration of the step 204, according to one embodiment of the invention.

During the fourth iteration of the step 204, the fourth group 400.4 is driven so as to modify the luminous intensities of the pixels 120.7 and 120.8 from their initial intensities 300.7 and 300.8 to their target intensities 310.7 and 310.8, without moving through intermediate luminous intensities.

The target beam 310 is thus produced by successively driving the groups of pixels formed in the step 202.

FIG. 6 presents the structure of a control module 110 for a lighting or signaling system 100, according to one embodiment of the invention.

The control module 110 comprises a processor 601 configured to communicate unidirectionally or bidirectionally, via one or more buses or via a direct wired connection, with a memory 602 such as a random access memory (RAM) or a read only memory (ROM) or any other type of memory (flash, EEPROM, etc.). As a variant, the memory 602 comprises several memories of the aforementioned types.

The memory 602 is able to store, permanently or temporarily, at least some of the data used and/or originating from the implementation of the method according to the invention. In particular, according to one embodiment, the memory 602 may store luminous intensity values for light beams matched with identifiers of beams. The memory 602 may also store rules for determining the number N of groups and the way to group pixels. The memory may further store the transition duration and the visual resolution frequency.

The processor 601 is able to execute instructions, which are stored in the memory 602, for implementing the steps of the method according to the invention, which are described with reference to FIG. 2. Alternatively, the processor 602 may be replaced by a microcontroller designed and configured to carry out the steps of the method according to the invention, which are described with reference to FIG. 2.

The control module 110 may further comprise a first interface 603 arranged to receive transition commands. The control module 110 may further comprise a second interface 604 which is able to drive the pixels 120.1 to 120.8 of the pixelated light source 120, notably by the groups 400.1 to 400.4 according to the invention.

The present invention is not limited to the embodiments described above by way of example; it extends to other variants.

The invention claimed is:

1. A method for controlling a pixelated light source of a lighting or signaling system for a light transition from an initial beam to a target beam, the pixelated light source comprising a plurality of pixels, the method comprising the following steps:

receiving a command to transition from the initial beam to the target beam;

for each pixel of the pixelated light source, defining a target luminosity based on the target beam;

for each pixel of the pixelated light source, converting the target luminosity into target electrical parameters;

grouping the pixels of the light source into at least two groups of pixels, each group of pixels comprising at least one pixel; and successively driving the groups of pixels, driving a group of pixels comprising modifying the luminosity of each pixel of the group, from an initial luminosity to the target luminosity of the pixel by adjusting the electrical parameters of the pixel to the target electrical parameters, wherein the target electrical parameters are among at least one of a duty cycle of a pulse-width modulation signal, and an electric current, and during the step of successively driving the group of pixels, each pixel is driven through at least one intermediary luminosity.

2. The method as claimed in claim 1, wherein the groups of pixels are driven successively in a random order.

3. The method as claimed in claim 1, further comprising defining a sequence of groups, and wherein the groups of pixels are driven successively in the defined sequence.

4. The method as claimed in claim 1, wherein the pixels of a group of pixels are adjacent.

5. The method as claimed in claim 1, wherein the groups of pixels are predefined.

6. The method as claimed in claim 1, wherein the groups of pixels are defined based on the target luminosities of the pixels of the light source.

7. The method as claimed in claim 1, wherein the pixels of the light source are grouped into N groups, N being greater than 1, wherein N depends on a duration of the transition from the initial beam to the target beam.

8. The method as claimed in claim 7, wherein N further depends on a visual resolution frequency.

9. A computer program comprising instructions for implementing the method as claimed in claim 1, wherein the instructions are executed by a processor.

10. The method as claimed in claim 2, wherein the pixels of a group of pixels are adjacent.

11. The method as claimed in claim 2, wherein the groups of pixels are predefined.

12. The method as claimed in claim 2, wherein the groups of pixels are defined based on the target luminosities of the pixels of the light source.

13. The method as claimed in claim 2, wherein the pixels of the light source are grouped into N groups, N being greater than 1, wherein N depends on a duration of the transition from the initial beam to the target beam.

14. A computer program comprising instructions for implementing the method as claimed in claim 2, wherein the instructions are executed by a processor.

15. A lighting or signaling system of an automotive vehicle, comprising a pixelated light source and a control module for controlling the pixelated light source, wherein the pixelated light source comprises a plurality of pixels and the control module comprises:

a first interface configured to receive a command to transition from an initial beam to a target beam;

a processor configured to define, for each pixel of the pixelated light source, a target luminosity based on the target beam, group the pixels of the pixelated light source into at least two groups of pixels, each group of pixels comprising at least one pixel, and convert, for each pixel of the pixelated light source the target luminosity into target electrical parameters; and a second interface configured to successively drive the groups of pixels, the driving of the group of pixels comprising modifying the luminosity of each pixel of the group, from an initial luminosity to the target luminosity of the pixel by adjusting the electrical parameters of the pixel to the target electrical parameters, wherein the target electrical parameters are among at least one of a duty cycle of a pulse-width modulation signal, and an electric current, and the second interface is further configured to drive each pixel of the group of pixels through at least one intermediary luminosity while driving each pixel to the target luminosity.

16. An automotive vehicle comprising the lighting or signaling system as claimed in claim 15.

* * * * *